United States Patent [19]

Park

[11] Patent Number: 5,974,134
[45] Date of Patent: Oct. 26, 1999

[54] METHOD OF AND APPARATUS FOR MANAGING CALL RESOURCES IN SWITCHING SYSTEM

[75] Inventor: Sang-Jin Park, Seoul, Rep. of Korea

[73] Assignee: SamSung Electronics Co., Ltd., Suwon, Rep. of Korea

[21] Appl. No.: 08/771,534

[22] Filed: Dec. 23, 1996

[30] Foreign Application Priority Data

Dec. 23, 1995 [KR] Rep. of Korea ...................... 95-55759

[51] Int. Cl.⁶ .................................................. H04M 3/00
[52] U.S. Cl. ............................ 379/242; 379/203; 379/268
[58] Field of Search ...................................... 379/203, 204, 379/205, 206, 208, 209, 242, 243, 244, 245, 257, 219, 220, 268

[56] References Cited

U.S. PATENT DOCUMENTS

| | | | |
|---|---|---|---|
| 3,859,473 | 1/1975 | Brown et al. | 379/209 |
| 4,691,347 | 9/1987 | Stanley et al. | 379/204 |
| 4,796,293 | 1/1989 | Blinken et al. | 379/204 |
| 5,136,581 | 8/1992 | Muehrcke | 379/202 |
| 5,363,427 | 11/1994 | Ekstrom et al. | |
| 5,420,909 | 5/1995 | Ng et al. | |
| 5,442,634 | 8/1995 | Cizek | |
| 5,483,587 | 1/1996 | Hogan et al. | 379/203 |
| 5,512,884 | 4/1996 | Hesse et al. | |
| 5,546,449 | 8/1996 | Hogan et al. | 379/203 |
| 5,583,869 | 12/1996 | Grube et al. | |

*Primary Examiner*—Scott Wolinsky
*Attorney, Agent, or Firm*—Robert E. Bushnell, Esq.

[57] ABSTRACT

A method and an apparatus for managing call resources, which can contribute to an improvement in the performance and stability of systems to which the method and apparatus are applied. Call processors are connected to a shared library via a resource manager which is internally provided with a resource management table for storing permanent processor ID numbers of the call processors and resource allocation information. The call manager controls access to the shared library in association with requests of the call processors for an allocation or release of the resources in such a manner that the access is given for only the stored permanent process ID's. When a request is made to release call resources currently in use, the call manager determines whether or not the process ID of a call process associated with the request for the release coincides with the process ID of the call process currently using the stored call resources. When the process ID's do not coincide with each other, the call manager rejects the request for the release and notifies the operator of such a rejection.

18 Claims, 2 Drawing Sheets

METHOD OF AND APPARATUS FOR MANAGING CALL RESOURCES IN SWITCHING SYSTEM

CLAIM OF PRIORITY

This application makes claims all benefits accruing under 35 U.S.C. §119 from an application for *Method Of And Apparatus For Managing Call Resources In Switching System* earlier filed in the Korean Industrial Property Office on Dec. 23, 1995 and there duly assigned Ser. No. 55759/1995.

FIELD OF THE INVENTION

The present invention relates to a switching system, and more particularly to a method and an apparatus for managing and allocating call resources.

BACKGROUND OF THE INVENTION

There are many patents that deal with the allocation of resources in a telephone communication system. For example, U.S. Pat. No. 5,363,427 for a *Telephone Resource Allocation method in a Communication System* to Ekstrom, et al. discloses a telephone resource allocation method in a communication system. When a request for allocation comes in, communication resource allocator tries to find an available telephone resource for that particular call. If no resource is available, the allocator waits for a telephone resource to become available from either the primary or the secondary set of telephone resources. Additional examples occur in U.S. Pat. No. 5,420,909 for a *Method For Allocating Telephone and Communication Resources* to Ng, et al., U.S. Pat. No. 5,512,884 for a *User Requested Communication Resource Allocation* to Hesse, et al., and U.S. Pat. No. 5,583,869 for a *Method For Dynamically Allocating Wireless Communication Resources* to Grube et al. Grube, et al. '869 re-allocates or releases telephone resources upon completion of a call.

Finally, U.S. Pat. No. 5,442,634 for a *Resource Allocation to Non-Critical Users* to Cizek discloses a telephone allocation system for both critical and non-critical users. The apparatus identifies user groups as either critical or non-critical. Based upon this classification, the apparatus either allocates or denies allocation of resources.

What is needed is a telephone allocation system and process that prevents one call from freeing up the resources allocated to another call in progress. Because such a scenario should not occur in the first place, what is also needed is a mechanism for notifying the operator whenever one call attempts to free up the resources allocated to another call in progress.

SUMMARY OF THE INVENTION

Therefore, an object to provide a method and an apparatus for preventing the premature de-allocation of resources of one call caused by another call.

It is also an object to alert the operator that an attempt to prematurely de-allocate the resources of one call by another call was attempted and denied.

In accordance with one aspect, the present invention provides a method for managing call resources in a switching system including a plurality of call processors adapted to execute call processing using an allocation of resources table stored in a resource manager. This resource manager interfaces with a shared library to allocate resources of a call and to prevent resources from being freed up from a calls already in progress. The invention made up of the steps of requesting an allocation of call resources from the shared library, allocating call resources from the shared library, storing the allocated call resources in a resource management table domain corresponding to the process identifier (ID) of the call, and if a request is made to release the stored call resources, then determining whether or not the request is from the same call processor that requested the resources in the first place, and rejecting the request for the release and notifying the operator when the process identifiers do not coincide with each other.

In accordance with another aspect, the present invention provides an apparatus for managing call resources in a switching system made up of call processors each adapted to execute the processing of a call in response to a request for the call processing, a shared library adapted to store allocated resources associated with the call processing, and call resource manager connected between the call processors and the shared library and internally provided with an allocation of resources resource management table for storing permanent process identifiers of the call processors and resource allocation information, the resource manager serving to control access to the shared library in association with requests from the call processors for an allocation or release of the resources in such a manner that the access is given for only the stored permanent process identifiers.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
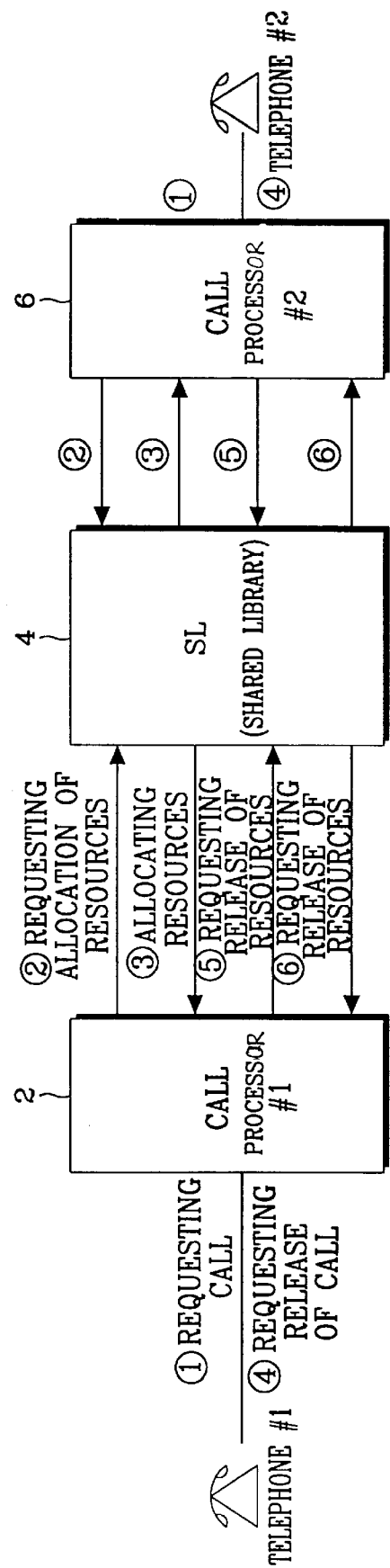
FIG. 1 is a block diagram illustrating a management of call resources.

A management of resources plan associated with a call processing in switching systems is illustrated in FIG. 1. In the case of FIG. 1, a call processor, which may be that denoted by the reference numeral 2 (call processor #1) or 6 (call processor #2) in FIG. 1, executes a call upon receiving a request for the call processing. The call processor calls a shared library 24 so that it can be allocated with a variety of call resources required for the call processing. After the completion of the call processing, the used call resources are released. For this release, the shared library 24 is called again. In this way, allocation and release of all call resources, which are used for a call processing, are carried out under control of shared library 24. This provides an advantage in that the management of call resources can be unified. Here, "call resources" include call registers, various signaling equipment, time slots associated with time switches, channels associated with spatial switches, etc. Such call resources are allocated for every call when call processing begins. Since call processing is executed for every call, particular call resources used for a particular call should be released by that particular call when the call processing for that particular call is completed. However, there is a significant drawback in such a management of call resources. In other words, problems occur when call resources, which are being used (or have been used) by a particular call, are requested to be released by another call or an optional call process. When such a request is made, the shared library 24 accommodates with the request without determining the source which requests the release of the call resources (or an allocation of those call resources). Once the shared library 24 begins a processing in response to such a request, the calls, which are normally in communication, are disconnected.

In accordance with earlier methods for managing call resources, the allocation and release of call resources required for a call processing are executed without any interference between a call processor and a shared library. However, such earlier methods are problematic in that there is no mechanism to solve a problem occurring when a call process #1 requests the release of the call resources which are in use by another call process #2. The present invention seeks to prevent this situation from ever occurring and to notify the operator when such an occurrence is about to occur.

Figure 2:
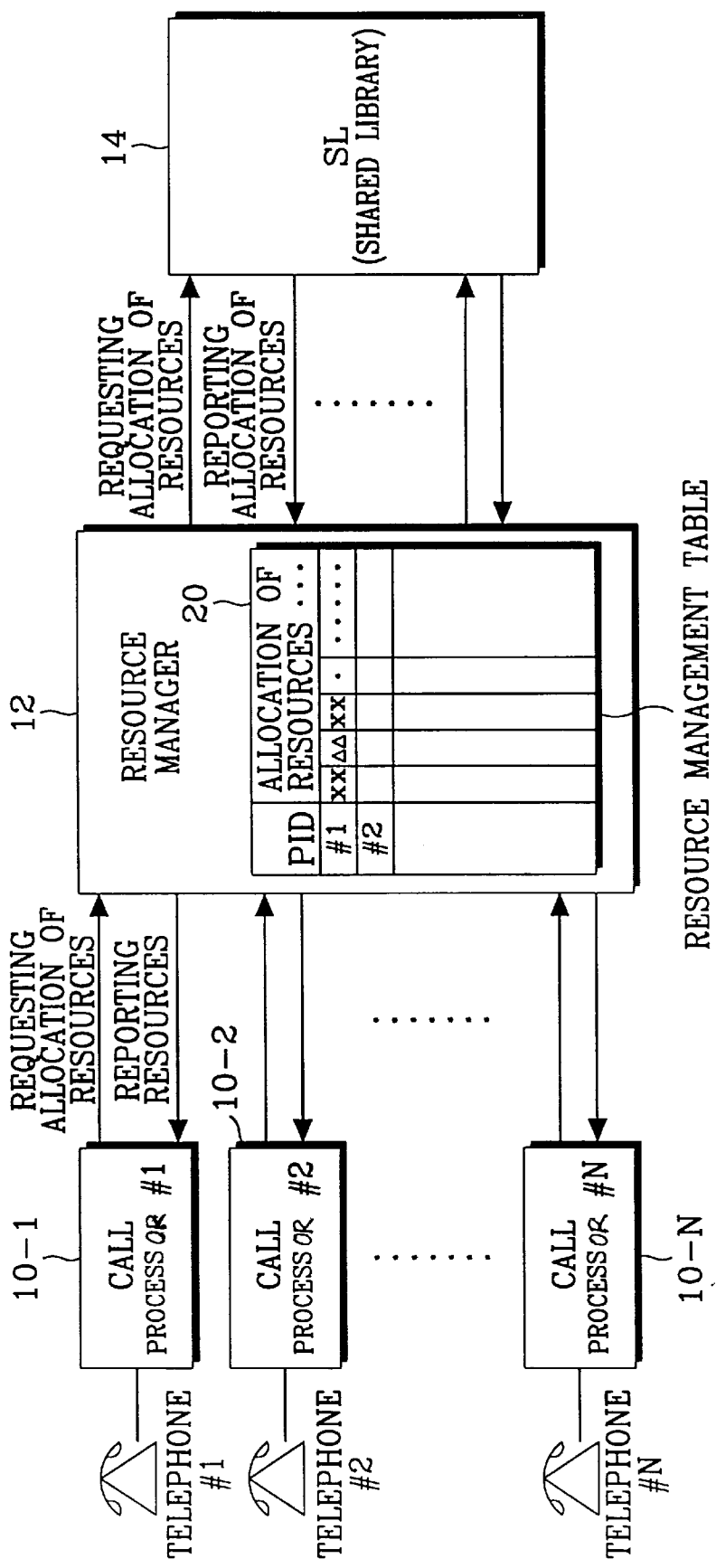
FIG. 2 is a block diagram illustrating a management of call resources in accordance with the present invention.

FIG. 2 illustrates an apparatus for managing call resources in accordance with the present invention. Referring to FIG. 2, a plurality of call processors 10-1, 10-2, . . . , and 10-N (N: a natural number) are shown. Each call processor serves to execute the processing of a call in response to a request for a call. For the call processing, the call processor is allocated with requisite call resources from shared library 14 which is stored with a variety of call resources. In accordance with the present invention, a resource manager 12 is connected between the call processors and shared library 14. Resource manager 12 serves to prevent the call processors from mismatching with the resources stored in the shared library 14. When a particular call processor 10-X (X: a natural number; X≧N) mismatches with the resources of the shared library 14, the resource manager 12 informs the operator of the mismatch so as to correct the mismatch. For instance, when the call processor #2, 10-2, requests a release or operation of resources which are in use in the call processor #1, 10-1, the resource manager 12 manages this request using a process identifier different from that associated with the call processor #1. In other words, the resource manager 12 manages call resources while assigning different process identifiers to requests of different call processes, respectively, thereby preventing the call resources from being inadvertently released or operated. For such a function, the resource manager 12 is internally provided with a resource management table 20 which stores permanent identifiers ("PID" denoted in FIG. 2) respectively assigned for all the call processes and information about allocation of each resource.

The management table 20 stores essentially requisite information about resources which are managed by the resource manager 12. The storage capacity of the management table 20 is determined based on the fact that the number of processes simultaneously produced in a particular main process can not exceed the maximum number of call registers. Typically, a call processing is executed for every call by starting a call processor 10-X associated with the call. After the completion of the call processing, the associated call processor 10-X is aborted. For such a call processing, the associated call processor 10-X is allocated with its permanent process identifier. After referring to such a permanent process identifier, the resource manager 12 accesses to the resource management table 20. Based on the result of the access, the resource manager 12 then requests a resource allocation or release to the shared library 14.

The operation of the resource manager 12 will now be described in more detail in conjunction with an exemplary case. When a subscriber #1 attempts a call, the call processor #1, 10-1, which is associated with the subscriber #1 and telephone #1 starts to set up the call. For this set-up, the call processor #1, 10-1, requests an allocation of requisite resources, such as call resistors, signaling equipment, and channel equipment, to the resource manager 12. Then, the resource manager 12 requests the resource allocation to the shared library 14 which, in turn, sends information associated with the requested resources to the resource manager 12. Thereafter, the resource manager 12 stores the received information in a domain of the resource management table 20 corresponding to the permanent process identifier of the call processor #1 (or the subscriber #1). In this case, the location is a processor #1 location.

When a subscriber #2 subsequently attempts a call, a call processing is executed in the same manner as mentioned above. In this case, however, the information from the shared library 14 is stored in a location of the resource management table 20 different from the location corresponding to the process identifier of the subscriber #1. If another call process, for example, the call processor #3, requests a release of the resources which are in use by the call process #1 (or #2), then the resource manager 12 rejects the request because the process identifier of the call process #3 does not coincide with the process identifier associated with the requested resources, namely, the process identifier of the call process currently using the resources. The resource manager 12 stores information about the rejection as abnormal information therein and then reports this fact to the operator.

As apparent from the above description, the present invention provides a method of and an apparatus for managing call resources which are capable of identifying an abnormal occasion in the management of call resources, performing an appropriate management against the identified abnormality, and reporting the result of the management to the operator. Thus, the method and apparatus of the present invention prevent the whole system from operating abnormally while contributing to a stable operation of the system.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method of allocating a plurality of resources in a telephone switching system, comprising the steps of:

placing a first call from a telephone handset;

requesting allocation of first resources selected from among said plurality of resources;

allocating said first resources for said first call;

completing said first call by requesting release of said allocated first resources;

releasing said allocated first resources, said plurality of resources in said telephone switching system being managed by a plurality of call processes each adapted to execute call processing using said plurality of resources stored in a shared resource storing means;

requesting an allocation of said first resources to said shared resource storing means at the request of a first call process responding to a calling attempt of a subscriber associated with said first call process;

receiving said allocated first resources from said shared resource storing means;

storing said allocated first resources in a resource management table domain corresponding to a first process identifier of said first call process; and determining whether a second process identifier of a second call process associated with said request for release of said allocated first resources corresponds to said first process identifier of said first call process currently using said allocated first resources, and rejecting said request for release when said process identifiers do not correspond with each other.

2. The method of claim 1, further comprising the steps of:

requesting allocation of said first resources for said first call, said requested first resources being currently used by a separate call in progress, said separate call being different from said first call;

denying said first call allocation of said first resources that are already being used by said separate call; and notifying an operator that said requested first resources have been already allocated to said separate call.

3. The method of claim 2, said request for allocation of said first resources by said first call being preceded by a request for release of said first resources that have been allocated to said separate call.

4. The method of claim 1, said determining step being performed in response to a request to release said allocated first resources.

5. The method of claim 1, said determining step being performed whenever a request is made to release said allocated first resources.

6. A method of allocating a plurality of resources in a telephone switching system, comprising the steps of:

placing a first call from a handset;

requesting an allocation of first resources selected from among said plurality of resources for said first call, said first resources currently being used by a second call in progress;

denying said first call said allocation of said first resources already being used by said second call;

notifying an operator that said first call requested said first resources already allocated to said second call, said plurality of resources in said telephone switching system being managed by a plurality of call processes and adapted to execute call processing using call resources stored in a shared resource storing means;

requesting an allocation of said first resources to said shared resource storing means at the request of a first call process responding to a calling attempt of a subscriber associated with said first call process;

receiving said allocated first resources from said shared resource storing means;

storing said allocated first resources in a resource management table domain corresponding to a first process identifier of said first call process;

when a request is made to release said stored first resources, determining whether a second process identifier of a second call process associated with said request for release coincides with said first process identifier of said first call process currently using said stored first resources, and rejecting said request for release when said first and second process identifiers do not coincide with each other; and storing said rejection of said request for release as abnormal information.

7. The method of claim 6, further comprising the step of requesting a release of said first resources already being used by said second call.

8. The method of claim 7, said step of requesting said release of said first resources preceding said step of requesting said allocation of said first resources for said first call.

9. The method of claim 7, said plurality of resources in said telephone switching system being managed by an apparatus, said apparatus comprising:

a plurality of call processors each adapted to execute a call processing in response to a request for said call processing;

a resource storing unit adapted to store resources associated with said call processing; and a call manager unit connected between said plurality of call processors and said resource storing unit and internally provided with a resource management table storing permanent process identifier numbers of said call processors and resource allocation information, said call manager unit serving to control an access to said resource storing unit in association with requests of said call processors for an allocation of said resources in such in such a manner that said access is given for only said stored permanent process identifier numbers.

10. The method of claim 9, further comprising said call manager unit serving to control an access to said resource storing unit in association with requests of said call processors for a release of said resources in such a manner that said access is given for only said stored permanent process identifier numbers.

11. The method of claim 6, said first call process corresponding to said first call and said second call process corresponding to said second call.

12. The method of claim 6, further comprising the step of reporting said abnormal information to an operator.

13. A method for managing call resources in a switching system including a plurality of call processes and adapted to execute call processing using call resources stored in a shared resource storing means, comprising the steps of:

requesting an allocation of first call resources to the shared resource storing means at the request of a first call process responding to a calling attempt of a subscriber associated with the first call process;

receiving said allocated first call resources from the shared resource storing means;

storing said allocated first call resources in a resource management table domain corresponding to a first process identifier of the first call process; and determining whether a second process identifier of a second call process associated with a request for a release of said stored first call resources corresponds to the first process identifier of the first call process currently using the stored first call resources, and rejecting said request for the release when the process identifiers do not correspond with each other.

14. The method of claim 13, said determining step being performed in response to a request to release said stored first call resources.

15. The method of claim 13, said determining step being performed whenever a request is made to release said stored first call resources.

16. The method of claim 13, further comprising the step of allocating said first call resources in response to said step of requesting said allocation of said first call resources.

17. A method for managing call resources in a switching system including a plurality of call processes and adapted to execute call processing using call resources stored in a shared resource storing means, comprising the steps of:

requesting an allocation of call resources to the shared resource storing means at the request of a first call process responding to a calling attempt of a subscriber associated with the first call process;

receiving the allocated call resources from the shared resource storing means;

storing the allocated call resources in a resource management table domain corresponding to a first process identifier of the first call process;

when a request is made to release the stored call resources, determining whether a second process identifier of a second call process associated with the request for the release coincides with the first process identifier of the first call process currently using the stored call resources, and rejecting the request for the release when the process identifiers do not coincide with each other; and storing the rejected request for the release as abnormal information, and reporting the abnormal information to an operator.

18. The method of claim 17, further comprising the step of allocating the call resources in response to said step of requesting said allocation of the call resources.

* * * * *